(12) United States Patent
Cuervo-Arango Y De Cachavera

(10) Patent No.: US 9,151,021 B2
(45) Date of Patent: Oct. 6, 2015

(54) MODULAR WATER-SAVING DEVICE

(76) Inventor: Alfonso Cuervo-Arango Y De Cachavera, Alicante (ES)

( * ) Notice: Subject to any disclaimer, the term of this patent is extended or adjusted under 35 U.S.C. 154(b) by 347 days.

(21) Appl. No.: 13/637,911

(22) PCT Filed: Mar. 29, 2010

(86) PCT No.: PCT/ES2010/000132
§ 371 (c)(1),
(2), (4) Date: Sep. 27, 2012

(87) PCT Pub. No.: WO2011/121140
PCT Pub. Date: Oct. 6, 2011

(65) Prior Publication Data
US 2013/0026242 A1    Jan. 31, 2013

(51) Int. Cl.
*E03B 7/04*       (2006.01)
*F24D 17/00*      (2006.01)

(52) U.S. Cl.
CPC ............ *E03B 7/045* (2013.01); *F24D 17/0078* (2013.01)

(58) Field of Classification Search
CPC . G05D 23/13; G05D 23/132; G05D 23/1333; E03B 7/045; F24D 17/0078
USPC ............. 236/12.11, 12.13; 137/337; 122/13.3
See application file for complete search history.

(56) References Cited

U.S. PATENT DOCUMENTS

| | | | |
|---|---|---|---|
| 4,945,942 A * | 8/1990 | Lund | 137/337 |
| 5,009,572 A | 4/1991 | Imhoff et al. | |
| 5,261,443 A | 11/1993 | Walsh | |
| 5,339,859 A * | 8/1994 | Bowman | 137/337 |
| 5,452,740 A | 9/1995 | Bowman | |
| 6,182,683 B1 | 2/2001 | Sisk | |
| 2009/0145490 A1 | 6/2009 | Kershisnik | |
| 2009/0211644 A1 | 8/2009 | Wylie et al. | |
| 2009/0266426 A1* | 10/2009 | Lee | 137/337 |

FOREIGN PATENT DOCUMENTS

| | | |
|---|---|---|
| DE | 37 23 089 A1 | 1/1989 |
| DE | 197 12 051 A1 | 9/1998 |

OTHER PUBLICATIONS

Translation of the International Preliminary Report on Patentability for PCT/ES2010/000132, filed Mar. 29, 2010.
International Search Report for PCT/ES2010/000132 dated Jul. 9, 2010.

* cited by examiner

*Primary Examiner* — Marc Norman
(74) *Attorney, Agent, or Firm* — Sughrue Mion, PLLC

(57) ABSTRACT

The invention relates to a modular device formed by a single module (1) for installation between the hot water pipe (H) and cold water pipe (C) and a faucet (4), consisting of: two feed line sections for hot water (2) and cold water (3); a recirculation pump (5) in a bypass conduit (12) that connects the inlet conduits (2) and (3); a pressure switch (6) in feed section (2); a flow meter (7) arranged in feed section (2); a thermal switch (8) in section (2); a check valve (9) at the intersection of the bypass conduit (12) and section (3); and water flow regulating means (10, 11) located between the bypass conduit (12) and the hot water feed section (2).

8 Claims, 2 Drawing Sheets

MODULAR WATER-SAVING DEVICE

OBJECT OF THE INVENTION

The present invention relates to a modular water-saving device. It particularly relates to an apparatus or device which allows recirculating the water supplied from a hot water supply source towards a hot water faucet until the hot water circulating through the conduit or pipe reaches a desired predetermined temperature, automatically and without the need for user intervention. The device described in the present invention applies to both domestic and industrial hot water installations.

DESCRIPTION OF THE STATE OF THE ART

A number of solutions to the water-saving problem have been described since the 1960s, there being many devices for this purpose on the market, such as thermostatic faucets, flow restricting heads, or complex remodeling jobs in installations for recirculating water.

For example, U.S. Pat. No. 5,261,443, "Watersaving recirculating system", describes a water recirculating system for a conventional water supply system wherein there are arranged a hydraulic coupling and a solenoid valve between a hot water feed line and a first cold water feed line. A check valve is arranged in the cold water feed line and a pump is arranged in the first cold water feed line for reversing the water flow through the first cold water feed line. The water flow through the hot water feed line is thus diverted through the first cold water feed line until the temperature of the water flowing through the hot water pipe reaches a predetermined valve. This device has an electrovalve installed close to the faucets which is opened selectively for diverting the supplied hot water flow while said flow does not reach a given temperature, controlled by a thermal switch, towards the cold water system, on application of a recirculation pump having an associated safety check valve when the system is activated using a push button switch.

Likewise, U.S. Pat. No. 5,452,740, "Water conservation system", describes a water maintenance system including a thermal control valve redirecting the water from a hot water tank to a storage tank until the temperature of the water coming from it reaches a predetermined temperature. The stored water is then mixed with the water directed to the cold water conduit by pressure in the storage tank and subsequently by siphon action. This document proposes transferring the water which is supplied from a hot water deposit, and which does not have the right temperature, to an auxiliary storage deposit or to an irrigation arrangement. A pressure restricting device is provided for assuring the circulation of the fluid supplying a sufficient differential pressure.

U.S. Pat. No. 5,009,572, "Water conservation device", relates to a compact and circular water maintenance device comprising a source of pressurized water, a hot water supply line, a cold water supply line, a water heater and outlet fixtures coupled to the hot and cold water pipes. This device basically includes an electric pump for pumping the water from the hot water pipe to a solenoid valve where hot and cold water are mixed. This valve is coupled directly to the cold water pipe, a thermal sensor being provided for detecting the temperature of the water as it enters the pump. The device thus creates a closed loop between the hot and cold water pipes. The device takes the cooled hot water to the cold water pipe, causing the hot water to come out without needing to recirculate the warm water towards the water heater. This document proposes a water conservation device presented in the form of a module and including a recirculation pump associated with an electrovalve that connects with the cold water system and with an outlet, said pump and electrovalve being installed in a bypass line between the hot water and cold water conduits. The device does not recirculate the hot water towards the heater and always maintains the hot water line at a given temperature suitable for service, informing of said situation through an indicator.

OBJECT OF THE INVENTION

The object of the present invention is a device especially designed for water saving which allows recirculating the water coming from the hot water pipe until it reaches a desired predetermined temperature automatically, without the need for manually activating any system or the user checking the water temperature.

The modular device of the invention automatically acts by simply turning the faucet on by means of its conventional on/off operation, whether by simply turning on a mixer tap or a standard faucet, and it does not require acting on a push button or switch for generating an overpressure in or activation of any circuit. By using the already existing hot and cold water pipes, such pipes are connected in the modular device, a closed circuit is formed which returns the hot water which is demanded and is not yet hot to the boiler or water heater instead of discharging it down the drain, with the subsequent water and energy savings.

The device of the present invention is made in the form of a compact module suitable for its easy installation without the need to modify already existing pipes, faucets, boilers or water heaters or to or add them, and without adding storage tanks or deposits, being directly applicable in both domestic and industrial hot water installations. To that end, the device of the invention is installed between the water taps or shut-off valves for cutting off water to the toilet, sink, shower or bidet and its conventional faucet. All the elements of the device are therefore incorporated in a module which is installed close to the faucet. The demand for hot water from a faucet having the module object of the present invention installed conditions the water for the rest of the faucets of that nearby environment, therefore it is not advisable to install it in the bath tub for preventing proximity of the electric current to the shower space.

The circulation of the water not yet heated is diverted towards the cold water pipe even though it is in the reverse direction, i.e., towards re-entry into the heating apparatus originally provided in the installation, by means of a system with water flow regulating means or electrovalves, temperature and pressure sensors, and a flow detecting device in the hot water conduit together with a small pump, all being included in the module.

The water will come out through the faucet only when it is at the desired temperature that is defined in the module, which could be the standard 30° C. or optionally adjusted according to the user's desire. An indicator for warning the user that there is no anomaly when hot water does not come out of the faucet when it is turned on is provided, showing that the "hot water is coming". An acoustic or light warning can alternatively be used. Depending on the chosen pump, the typical hot water waiting time is reduced, which is another great advantage of the present invention.

DESCRIPTION OF THE DRAWINGS

In order to better understand the invention, the following illustrative and non-limiting drawings relating to the scope of the invention are attached.

PREFERRED EMBODIMENT

Figure 1:
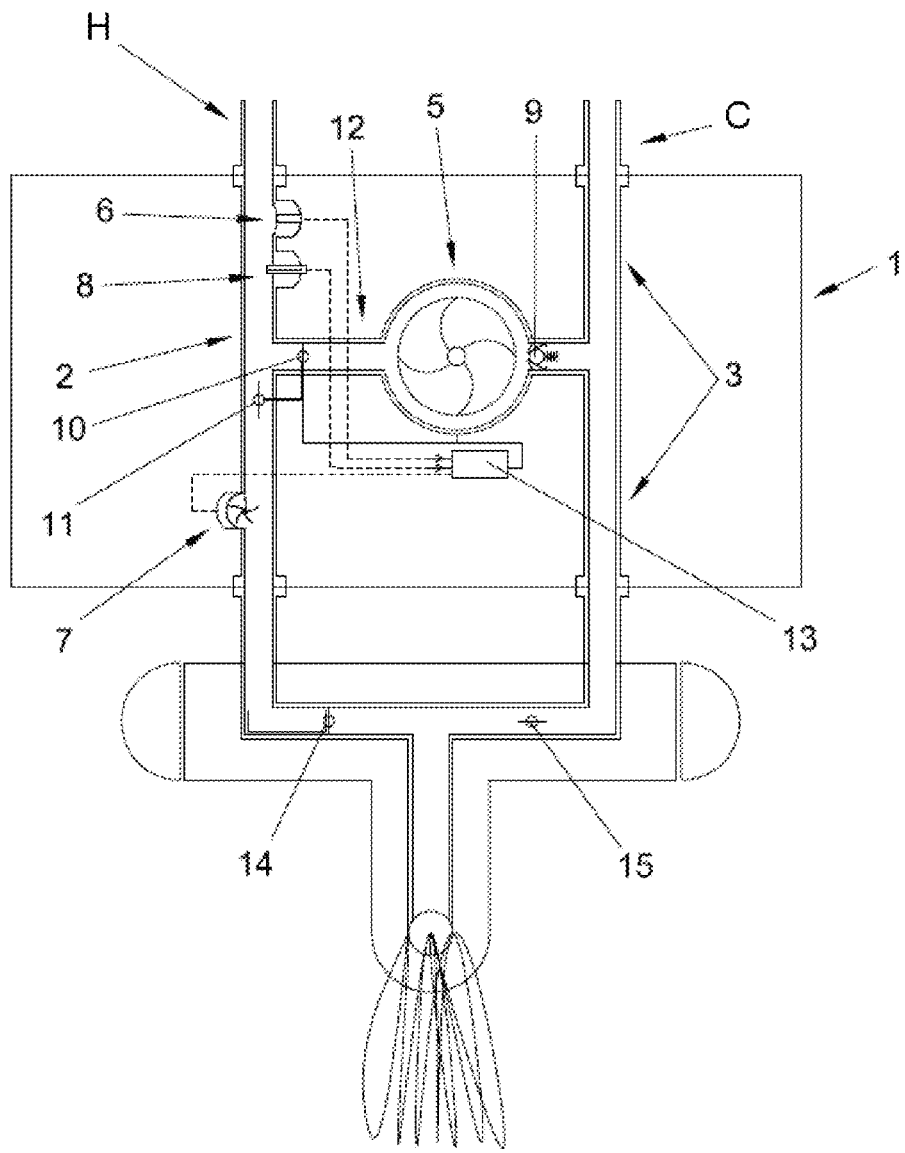
FIG. 1 shows a diagram of the modular device of the present invention according to a preferred embodiment thereof.

As shown in FIG. 1, the modular device of the invention is formed by a single block or module (1) provided for its installation between the hot water shut-off valve (H) and cold water shut-off valve (C) and the faucet (4).

Said device basically consists of the following elements:
- two feed line sections for hot water (2) and cold water (3) which are connected by suitable means to the hot water feed pipe (H) and cold water feed pipe (C) of the faucet (4).
- a water recirculation pump (5) installed in a bypass conduit (12) that connects the hot water conduit (2) and cold water conduit (3);
- a pressure switch (6) arranged in the hot water feed section (2) downstream from the bypass (12), before the normally open valve (11);
- a flow meter (7) arranged in the hot water feed section (2) downstream from the bypass (12), after of the normally open valve (11) and immediately before the faucet (4);
- a thermal switch (8) arranged in the conduit hot water supply conduit (2) upstream from the bypass conduit (12);
- a safety check valve (9) arranged at the intersection of the bypass conduit (12) and the cold water feed section (3), which can be located before or after the recirculation pump
- water flow regulating means (10, 11) allowing either passage through the bypass conduit (12) or through the hot water feed section (2) downstream from the bypass conduit (12) and upstream from the flow meter (7), and
- a control system (13) which analyzes the values provided by the pressure switch (6), the flow meter (7) and the thermal switch (8) and likewise controls the pump (5), the first electrovalve (10) and the second electrovalves (11), which is connected to an electrical power supply.

As indicated, these elements are integrated in a single block or module (1) which can be installed close to a faucet (4) and can be connected to the hot water feed system (H) and cold water feed system (C), having a completely neutral behaviour except when hot water is demanded, at which time it is activated as a result of actuating the different components controlled and managed by the control system (13).

The module (1), including the aforementioned elements, will preferably be arranged in an area close to the faucet (4) between the water supply pipes (H, C) and said faucet.

The bypass (12) allows connection with the pump (5) of the hot water supply section (2) and cold water supply section (3), said bypass (12) being suitable for diverting the water which has not yet reached the desired temperature, circulating from the hot water section (2) towards the cold water section (3).

The pressure switch (6) arranged in the hot water feed section (2) upstream from the bypass (12) allows detecting the pressure in the hot water supply conduit (2), thus preventing the pump (5) from working in vacuum conditions, for example with a pressure greater than one atmosphere.

The flow meter (7) installed in the hot water feed section (2) downstream from the bypass (12) and immediately before the faucet (4) activates the control module when hot water is demanded from said faucet.

The use of a check valve (9) is optional and its function is to prevent cold water, with its higher pressure, from entering the hot water pipe, in the event of a pressure drop in the hot water connection, when it overcomes the pressure of the hot water combined with the pressure produced by the pump.

The water flow regulating means (10, 11) can be formed by a first normally closed electrovalve (10) arranged in the bypass conduit (12), and a second normally open electrovalve (11 arranged in the hot water feed section (2) downstream from the bypass conduit (12) and upstream from the flow meter (7), and The thermal switch (8) arranged in the hot water supply conduit (2) upstream from the bypass conduit (12) allows controlling the temperature of the hot water circulating through the modular device of the invention, such that if it does not reach the desired temperature, for example the temperature is less than 30° C., it opens the first normally closed electrovalve (10), it closes the second normally open electrovalve (11) and operates the pump (5) for assuring recirculation of this water towards the cold water section (3) passing through the check valve (9). Thus, the water which is not yet hot is not lost down the drain but goes towards the heating source, boiler or water heater (16). If the water has the desired temperature, the second normally open electrovalve (11) allows it to come out of the faucet (4).

The first valve (10) is normally closed and the second valve (11) is normally open, such that in the event of a power supply failure, coil failure or disconnection from the system, the module object of the present invention allows use as a conventional faucet, thus preventing that the use of the faucet could be blocked when supplying hot water or cold water since said second valve will be kept open and said first valve will be kept closed as if it were a conventional faucet.

These two electrovalves can optionally be replaced by a three-way electrovalve.

The modular device optionally has a warning element associated with the control device (13) which indicates that the faucet (4) that is on is still not supplying hot water, but that it will arrive soon (the lukewarm water is reheated by means of the operating capacity of the device of the invention, which further entails energy saving as the warm water does not go down the drain but rather is recirculated).

In one embodiment of the invention the modular device also optionally has a "breakdown at heat source" warning, also associated with the control and management device (13) when the water does not reach the determined temperature in the established time.

The modular device of the invention is thus capable of detecting effective fluid circulation in the hot water conduit right away when the faucet is turned on and is not activated by a decrease in pressure as in other devices, since it could easily be affected by any pressure variation in the system.

Figure 2A:
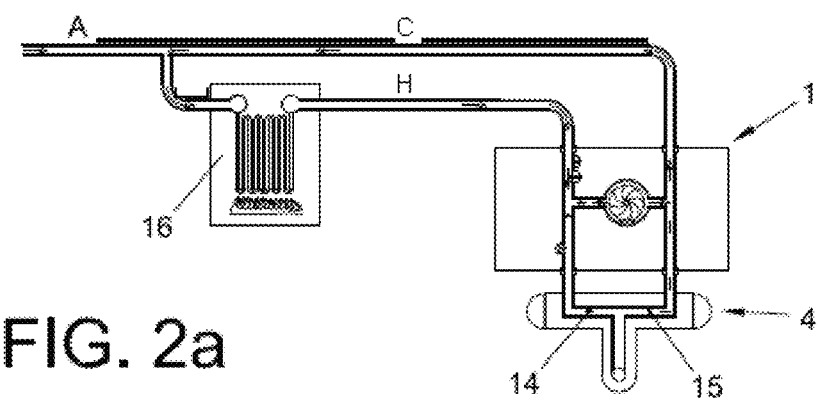
FIG. 2 shows an operating diagram of the modular device according to FIG. 1 when hot water is demanded, including FIGS. 2a, 2b and 2c.
Figure 2B:
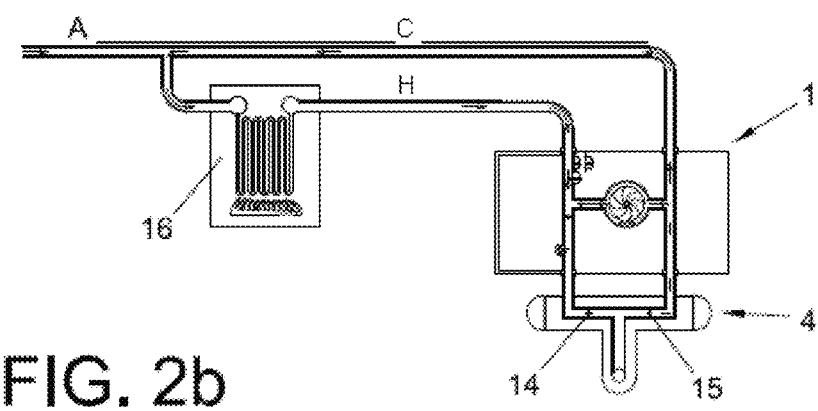
Figure 2C:
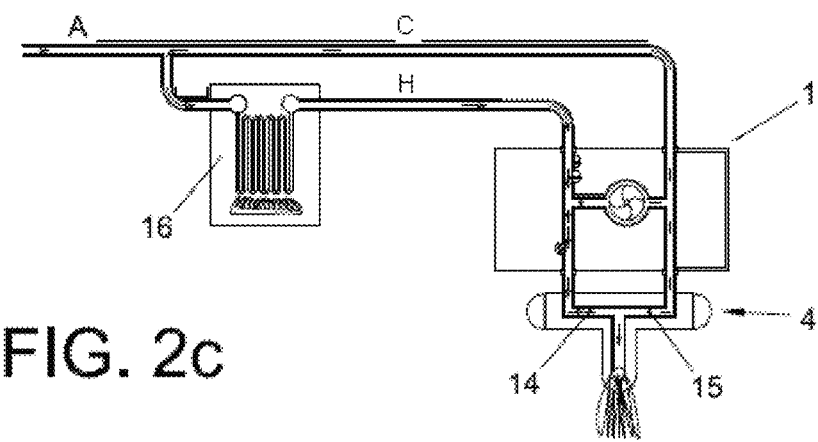

An operating sequence of the module of the present invention is shown in FIGS. 2a, 2b and 2c, in which the system from the general water connection (A) up to the point where the hot water faucet or outlet (4) is located can be seen.

FIG. 2a shows how when the hot water faucet is turned on the valve associated with it (14) causes the water contained in the hot water conduit (H) as well as the water contained in the hot water section (2) of the module (1) to start circulating. When the flow meter (7) detects this movement and if the thermal switch (8) verifies that the water is not at the programmed temperature, usually 30° C., the controller (13) activates the second electrovalve 11 closing the hot water conduit (2) downstream from the bypass (12), opening the first electrovalve (10) in the bypass (12) and activating the pump (5) to recirculate the water towards the cold water section (3) and subsequently to the cold water conduit (C) where it returns towards the main connection, where the heat source, water heater or boiler (16) is demanding water to supply the hot water faucet which has been turned on. The same is shown in FIG. 2b where the water starts to arrive hot but still not at the desired and programmed temperature.

FIG. 2c shows the faucet (4) ejecting hot water since the desired temperature measured by the thermal switch (8) has been reached, the control system (13) has closed the first electrovalve (10) of the bypass (12), the pump (5) has stopped, and the second electrovalve (11) of the hot water section (2) has been opened, thus allowing the hot water at the desired temperature to come out of the faucet.

It is also possible to incorporate a timer in the module the objective of which is to limit the time for the hot water to come out of the faucet, such that if a predetermined time of turning a faucet on is exceeded, it probably means that someone has turned the faucet on and has forgotten to turn it off, so after the predetermined minutes, the second normally open electrovalve (11) is closed, thus preventing the waste of water and heat energy.

The invention claimed is:

1. A modular water-saving device (1) provided for installation between the hot water supply pipe (H) and cold water supply pipe (C) and a faucet (4), comprising at least the following components in a single block or module:
    two feed line sections for hot water (2) and cold water (3), respectively, the feed line section for hot water between the hot water feed pipe (H) and the faucet (4) and the feed line section for cold water between the cold water feed pipe and the faucet;
    a water recirculation pump (5) installed in a bypass conduit (12) that connects the hot water feed line section (2) and cold water feed line section (3);
    a pressure switch (6) arranged in the hot water feed line section (2) upstream from the bypass (12);
    a flow meter (7) arranged in the hot water feed line section (2) downstream from the bypass (12) and immediately before the faucet (4);
    a thermal switch (8) arranged in the hot water feed line section (2) upstream from the bypass conduit (12);
    electrovalves (10, 11) allowing either passage through the bypass conduit (12) or through the hot water feed line section (2) downstream from the bypass conduit (12) and upstream from the flow meter (7); and
    a control device connected to the pump, the pressure switch, the flow meter, the electrovalves and the thermal switch.

2. The modular device according to claim 1, comprising a safety check valve (9) arranged at the intersection of the bypass conduit (12) and the cold water feed line section (3).

3. The modular device according to claim 1, comprising an element warning that the faucet (4) which is turned on does not supply hot water but that hot water will arrive soon.

4. The modular device according to claim 1, comprising a "breakdown at heat source" warning that informs when the water does not reach the desired temperature in an established time predetermined by a timer.

5. The modular device according to claim 1, comprising a timer to limit the time for the hot water to come out of the faucet from the time hot water begins to flow out of the faucet.

6. The modular device according to claim 1, wherein the electrovalves comprise a first electrovalve (10) arranged in the bypass conduit (12) and a second electrovalve (11) arranged in the hot water feed line section (2) downstream from the bypass conduit (12) and upstream from the flow meter (7).

7. The modular device according to claim 1, wherein the electrovalves are formed by a three-way electrovalve.

8. The modular device according to claim 1, comprising a warning when water does not reach the desired temperature by a predetermined time.

* * * * *